(12) United States Patent
Wagner et al.

(10) Patent No.: US 8,879,054 B2
(45) Date of Patent: Nov. 4, 2014

(54) HIGH RESOLUTION WAVELENGTH MEASUREMENT SYSTEM USING A COARSE, STABLE TIMING SIGNAL

(71) Applicants: Chris Wagner, Ottawa (CA); Eugene Chan, Kanata (CA)

(72) Inventors: Chris Wagner, Ottawa (CA); Eugene Chan, Kanata (CA)

(73) Assignee: JDS Uniphase Corporation, Milpitas, CA (US)

(*) Notice: Subject to any disclaimer, the term of this patent is extended or adjusted under 35 U.S.C. 154(b) by 242 days.

(21) Appl. No.: 13/632,192

(22) Filed: Oct. 1, 2012

(65) Prior Publication Data

US 2014/0092387 A1    Apr. 3, 2014

(51) Int. Cl.
*G01N 21/27* (2006.01)
*H04B 10/073* (2013.01)

(52) U.S. Cl.
CPC ................... *H04B 10/0731* (2013.01)
USPC ......................... 356/124; 356/73.1

(58) Field of Classification Search
CPC .................................................. H04B 10/0731
USPC ............. 356/124, 124.5, 125, 73.1, 479, 477, 356/402; 250/227.14, 226
See application file for complete search history.

(56) References Cited

U.S. PATENT DOCUMENTS

| | | | |
|---|---|---|---|
| 5,896,193 A | 4/1999 | Colbourne et al. | 356/124 |
| 6,061,124 A | 5/2000 | Nyman et al. | 356/124 |
| 6,359,685 B1 | 3/2002 | Colbourne et al. | 356/124 |
| 6,376,830 B1 * | 4/2002 | Froggatt et al. | 250/227.14 |
| 6,552,782 B2 | 4/2003 | Colbourne et al. | 356/124 |
| 6,870,629 B1 * | 3/2005 | Vogel et al. | 356/519 |
| 6,940,588 B2 | 9/2005 | Woodside et al. | 356/124 |
| 7,079,253 B2 | 7/2006 | North-Morris et al. | 356/454 |
| 7,835,009 B2 * | 11/2010 | Minneman et al. | 356/477 |
| 8,279,438 B2 * | 10/2012 | Yamashita et al. | 356/303 |

* cited by examiner

*Primary Examiner* — Sang Nguyen
(74) *Attorney, Agent, or Firm* — Teitelbaum & MacLean; Neil Teitelbaum; Doug MacLean

(57) ABSTRACT

A source generates an optical test signal sweeping a bandwidth of wavelengths over time. The test signal is applied to a device under test (DUT) to generate a response signal. A timing signal generator connected to the source generates a timing signal having triggers at time instances corresponding to known wavelengths of the test signal. A DUT detector samples the DUT response signal generating sampled DUT data using a sampling period that is shorter than a shortest time between timing signal triggers. A correlator receives the timing signal, the known wavelengths associated with the timing signal triggers, the sampled DUT data and the DUT detector sampling period then correlates each sampled DUT datum to a wavelength of the test signal that was applied to the DUT when the DUT datum was sampled by interpolating the known wavelengths using the trigger time instances and the DUT detector sampling period.

18 Claims, 10 Drawing Sheets

HIGH RESOLUTION WAVELENGTH MEASUREMENT SYSTEM USING A COARSE, STABLE TIMING SIGNAL

CROSS-REFERENCE TO RELATED APPLICATIONS

The present invention claims priority from U.S. Provisional Patent Application No. 61/540,629 filed Sep. 29, 2011, which is incorporated herein by reference.

TECHNICAL FIELD

The present invention relates to optical wavelength sweeping test systems and more particularly to such systems where data from a device under test is collected at a higher resolution than the reference signal provided by the wavelength sweeping test system.

BACKGROUND OF THE INVENTION

A swept wavelength system (SWS) is an optical test system that applies an optical test signal to a device under test (DUT) and records optical power data samples from the DUT. The wavelength of the optical test signal varies with time over a continuous range of wavelengths, thus the test signal is described as a swept wavelength test signal. The rate of change in wavelength may be irregular which makes it difficult to prepare SWS data having uniform time or wavelength spacing.

Existing swept wavelength systems (SWSs) collect data synchronous to an optical wavelength reference (etalon) provided by the SWS, thus the resulting data is sparse (one sample per etalon peak) as illustrated in FIG. 5. The wavelength reference occurs at known but irregular wavelength intervals λ1, λ2 and at unknown and potentially irregular time intervals s0, s1. Accordingly, a wavelength timing signal 510 triggers when the wavelength reference hits its known wavelengths λ1, λ2. Optical power samples 520 are acquired from the DUT at the triggers because at the time instant of a trigger the wavelength of the test signal applied to the DUT corresponds to one of the known wavelength references, thus the DUT response to that wavelength can be determined. The wavelength and time irregularities of wavelength references and wavelength timing signals are well known and occur because of the irregular rates of wavelength change in swept wavelength sources and the spectral characteristics of the particular etalon in the SWS, for example. Accordingly, the resulting data from existing SWSs is sparse (because it can only be measured in sync with the wavelength references) and it is irregular in wavelength and time interval (because of inherent irregularities) making use of data from existing SWSs challenging.

In SWSs such as those disclosed in U.S. Pat. Nos. 5,896,193; 6,061,124; 6,359,685; 6,552,782; and 6,940,588 which are incorporated herein by reference, optical power data is sampled from one or more devices under test (DUT) by detectors. The optical power data samples are acquired synchronously with the wavelength timing signal and hence are intrinsically correlated with the reference wavelength associated with that trigger. However, the wavelength reference and the wavelength timing signal are coarse (providing low wavelength resolution) and irregularly spaced over time. This makes it difficult to over-sample while maintaining the necessary wavelength correlation.

Existing SWSs sweeping the CL-band may include 35,600 timing pulses corresponding to 35,600 wavelength correlated optical power samples at roughly 3 picometers of resolution. Disadvantages of these SWSs include the inability to dynamically scale to higher wavelength resolutions and being unable to reduce noise without increasing measurement tine.

Turning now to FIGS. 1 and 2, an existing distributed SWS 8 is illustrated. SWSs associated with FIGS. 1 and 2 are described in greater detail in U.S. Pat. Nos. 6,940,588 and 7,079,253, which are incorporated herein by reference. In the distributed SWS 8, a front end 30 includes a tunable test laser 10 generating an optical test signal $S_L$ and a timing signal generator 14 generating a wavelength timing signal $S_T$ from a tap 12 from the test signal $S_L$. These signals are combined by a wavelength division multiplexer (WDM) 16 and distributed 43 to a plurality of remote test stations 40a, 40b etc.

As illustrated in FIG. 2, the timing signal generator 14 uses a single fixed etalon 31 to generate a pulse train and a single Fiber Bragg Grating (FBG) 32 to generate a reference pulse, (e.g. 1520 nm) from signals tapped 12, 12a, 12b, 12c from the optical test signal $S_L$. A second laser 34, generates the wavelength timing signal $S_T$ from electronics 33. The wavelength timing signal $S_T$ is multiplexed 16 with the optical test signal $S_L$ for transmission to the remote test stations 40a, 40b etc.

A remote test station 40a, 40b includes a wavelength division multiplex (WDM) filter 18 for separating the optical test signal $S_L$ and the wavelength timing signal $S_T$. The wavelength timing signal $S_T$ is provided to correlator 20, which also receives sampled data from detectors 22 and 24. Several detectors 22 can be included for simultaneously detecting the output of a multi-output DUT such as a WDM filter. Generally, a large fraction (e.g. 90%) of the optical test signal output from the filter 18 is provided to the DUT 26; while a small portion (e.g. 10%) is provided to the detector 24. The optical power signal from the DUT 26 is directed to the detector 22. The actual intensity, or power, measured at the output of the DUT 26 is provided by the detector 22 to the correlator 20. Thus the correlator 20 can calculate the loss through the DUT 26 and can determine the corresponding wavelength for that particular loss calculation, in dependence upon the wavelength timing signal $S_T$.

Referring now to FIG. 3, a schematic is illustrated for an optical test system 6 that is representative of an existing improvement to the SWS 8 described above. This SWS improvement is described in U.S. application Ser. No. 13/598,666, filed Aug. 30, 2012 which is incorporated herein by reference. Although U.S. application Ser. No. 13/598,666 could be implemented as a distributed SWS, the optical test system 6 in FIG. 3 is a benchtop embodiment of an SWS which does not use a second laser to generate the optical wavelength timing signal $S_T$ because the timing signal can be transmitted electrically. To change optical test system 6 into a distributed SWS, a second laser and a multiplexer may be included to permit the timing signals to be transmitted to remote stations via optical fiber.

In FIG. 3, a swept tunable laser 30 provides portions of a swept optical test signal 43 to two tracking stages 35 and 45, an optional wavelength reference cell 46 (such as a gas absorption cell), a reference power detector 44 and a device under test (DUT) 39. The swept optical test signal 43 from the swept tunable laser 30 is carried on an optical waveguide, such as an optical fiber. One or more splitters or taps are used to separate off the various signals, preferably with a majority of the test signal being transmitted to the DUT 39. The swept test signal is provided to the DUT 39 and the transmission response of the DUT 39 is measured by a detector 41. Alternatively, the reflection response from the DUT 39 is measured with an appropriately configured detector (not illustrated), or a second DUT detector is provided to simultaneously measure the transmission and reflection response from the DUT 39. The detector 41 converts light from the DUT 39 to an electrical signal (detector signal), which is provided to a digital signal processor ("DSP") 50. The DSP 50 processes the detector signals from any of the detectors 36, 38, 41, 42, 44 and includes digital logic circuitry and software for signal processing. Detector 44 is an optional reference power detector which may be used to subtract out any variation in output power from the swept laser source 30 that would be a source of uncertainty in the measurement.

Tracking stages 35 and 45 include optical filter elements 37, 39 that generate a periodic optical signal as a function of input wavelength. Examples of these filters include multiple-beam fiber interferometers and Fabry-Perot filters. Fiber based Fabry-Perot filters are preferred in some embodiments because they are more easily temperature controlled and/or held at matched temperatures. Filter 37 has an FSR (free spectral range) small enough that it provides sufficient wavelength resolution. The range of FSR will depend on the application but will typically be in the range of 1 to 10 pm. Filter 39 has an FSR that is almost identical to filter 37, but is slightly longer, or slightly shorter, such that the periodic signals from the detectors of filters 37 and 39 will only become synchronized after a plurality of pulses, i.e. different number of pulses between markers depending on the particular FSR, and thereby generate a periodic beat frequency that is greater than the maximum expected mode hop of the swept laser system 6. This is illustrated in FIG. 4 using an example where the difference in FSR between the two filters is 0.3 pm. A difference larger than about 20% of the FSR between filters is not very useful. For many applications, it is better if the difference is even smaller, but it becomes progressively more expensive to make filters that have FSRs that are tightly controlled, so the practical lower limit might be more like 1% of the FSR (0.03 pm).

FIG. 4 illustrates an example of the infrequent synchronous beating of filters 37 and 39 where the filters 37, 39 are fiber-based etalons with a cavity length of 0.27 m and 0.24 m. Each of these etalons have an FSR of close to 3 pm, but beat together (align in phase) only every 30 pm (as shown by the arrows in FIG. 4).

Returning to FIG. 3, the outputs of detector 36 and 38 for the two filters 37 and 39 respectively are monitored electronically and the synchronization points (or beat pulses) are determined in the DSP block 50. In this embodiment, the DSP block includes an FPGA or other suitable hardware and software, which performs the necessary computation to determine the synchronization and may optionally include memory 52. The DSP also correlates the signal from the DUT detector 41 with the signals from the filter detectors 36 and 38 to provide an accurate wavelength for each measurement point from the DUT response signal, as is well known in the art of SWS.

The single etalon timing signal generator 14 illustrated in FIGS. 1 and 2 is commonly found in legacy SWSs. In the more recent SWSs demonstrated in FIGS. 3 and 4, the timing signal generator comprises the two filter stages 35, 45 and the reference cell 46. The timing signal is generated using the 2 fixed etalons, instead of one, and the Gas Cell 46 which provides the reference pulse in place of the Fiber Bragg Grating. The precise implementation of the timing signal generator is not relevant present disclosure; however, since the present disclosure focuses on the processing of the timing signals, not their generation, and both the legacy SWSs, and the more recent SWS both generate equivalent timing signals.

As illustrated in FIG. 5, existing SWSs provide sparse data synchronous with their etalon peaks because the etalon peaks of the SWS are the only points where the SWS knows the exact wavelength of the wavelength sweeping test signal applied to the DUT. The irregular period of the wavelength timing signal 510 corresponds to the irregular wavelength sweeping rate of the test signal source. Accordingly, existing SWSs acquire optical power samples 520 synchronously with the etalon peaks (and only once per etalon peak) because the wavelength of the test signal applied to the DUT is known only at those etalon peaks. To simplify data sampling, a wavelength timing signal 510 or synonymous signal is used in existing SWSs to translate the timing of etalon peak into a signal 510 that can coordinate the sampling of DUT data 520. In some existing SWSs, improvements have been made to identify mode hops (when the test signal undesirably skips some of the wavelengths that the SWS is trying to sweep) and adjust the wavelength and sampled data correlation. The present disclosure describes improvements to SWSs that are compatible with all these types of SWSs and many more.

Existing SWSs use each timing signal pulse as a trigger to take a measurement. This provides an array of measurements that coincide with trigger pulses which are all at known wavelengths. Increasing the resolution of an SWS requires one of two basic approaches. The first would be to simply generate the timing signal pulses at a finer resolution. There are several challenges with this approach. Firstly, the length of the etalon becomes several meters in length which becomes a major problem mechanically as this etalon requires temperature stabilization and coiling the fiber etalon too much introduces unwanted optical effects that can affect the wavelength periodicity of the etalon negatively. Secondly, it becomes progressively more and more difficult to align an edge of the etalon to the reference gas cell line. Thirdly, this approach is not backwards compatible with existing systems since this requires a change in the optics in the wavelength discriminator. The alternate approach is to continue to use the existing timing signal, but take intermediate samples between the timing pulses. Ideally this could be achieved by using a phase lock loop that would lock to the frequency of the timing signal, and then the frequency could be multiplied up to whatever frequency is needed to achieve the desired resolution. The challenge with this approach is that the speed of the laser is not constant over the entire wavelength range, making the timing pulses somewhat erratic. A phase lock loop cannot remain locked to this signal. An alternate solution is required. The present disclosure describes such a solution.

The above described existing swept wavelength systems (SWSs) are restricted to collecting irregularly time and wavelength spaced sparse optical power data because they collect data synchronous to an optical wavelength reference (etalon) which itself occurs at irregular intervals in wavelength and time. It would be advantageous to provide an SWS that can collect regularly spaced optical power data at a sampling rate higher than the wavelength reference. It would also be advantageous to provide an SWS that can provide data in regularly time or wavelength spaced intervals.

SUMMARY OF THE INVENTION

The present disclosure overcomes the existing SWS deficiencies described above by using high speed data acquisition to provide higher wavelength resolution in the sampled data. This data acquisition occurs asynchronously to the wavelength reference or wavelength timing signal of the SWS; however a correlator is provided to correlate the asynchronously sampled data to wavelength timing signal associated with the test signal wavelengths applied to the DUT. Additional processing can then reduce noise effect, interpolate data onto a regular fixed wavelength grid, or any combinations thereof providing greater utility to the end user.

An embodiment of the present disclosure provides an apparatus comprising a source for generating an optical test signal sweeping a bandwidth of wavelengths over time, the test signal for application to a device under test (DUT) to generate a response signal from the DUT; a timing signal generator connected to the source for generating a timing signal, the timing signal having triggers generated at time instances corresponding to known wavelengths of the test signal; a DUT detector for sampling the DUT response signal to generate sampled DUT data, the DUT detector having a sampling period that is shorter than a shortest time between timing signal triggers; a correlator for receiving the timing signal, the known wavelengths associated with the timing signal triggers, the sampled DUT data and the DUT detector sampling period, the correlator for correlating each sampled DUT datum to a wavelength of the test signal that was applied to the DUT when the DUT datum was sampled by interpolating the known wavelengths using the trigger time instances and the DUT detector sampling period.

Another embodiment of the present disclosure provides a method for testing a device under test (DUT), the method comprising: applying an optical test signal to the DUT; sweeping the optical test signal over a bandwidth of wavelengths while applying the optical test signal to the DUT; generating a timing signal from the test signal while the test signal is applied to the DUT, including generating triggers at time instances corresponding to known wavelengths of the test signal; generating a response signal from the DUT in response to applying the test signal to the DUT; sampling the DUT response signal at a sampling period that is shorter than a shortest time between timing signal triggers, the sampling generating sampled DUT data; and correlating each sampled DUT datum to a wavelength of the test signal that was applied to the DUT when the DUT datum was sampled by interpolating the known wavelengths using the trigger time instances and the DUT detector sampling period.

Yet another embodiment of the present disclosure provides a non-transitory computer readable medium having computer executable instructions stored therein, the instructions comprising: instructions for directing a source to generate an optical test signal sweeping a bandwidth of wavelengths over time; instructions for applying the test signal to a device under test (DUT) to generate a response signal from the DUT; instructions for directing a timing signal generator connected to the source to generate a timing signal, the timing signal having triggers generated at time instances corresponding to known wavelengths of the test signal; instructions for directing a DUT detector to sample the DUT response signal and generate sampled DUT data; instructions for setting a sampling period of the DUT detector that is shorter than a shortest time between timing signal triggers; instructions for correlating each sampled DUT datum to a wavelength of the test signal that was applied to the DUT when the DUT datum was sampled by interpolating the known wavelengths using timing information from the timing signal triggers and the DUT detector sampling period.

BRIEF DESCRIPTION OF THE DRAWINGS

The present disclosure is described with reference to the following figures. While preferred embodiments may be illustrated or described herein, they are not intended to limit the invention. Rather, numerous changes including alternatives, modifications, equivalents and obvious variations may be made as would be understood by the person skilled in the art. As always, the invention is defined by the appended claims. Several common elements typically found in SWSs and optical test systems, such as user input devices, power supplies, output device (e.g. displays or printers), drive circuitry, optical waveguides and other optical connectors are omitted from the figures for simplicity of illustration and because they are well known in the art.

DETAILED DESCRIPTION

The present disclosure applies to improving swept wavelength systems (SWSs) for greater wavelength resolution of sampled optical power data compared to the wavelength timing signal without increasing the noise generated or the measurement time required for the SWS to test a device under test (DUT).

One advantage of embodiments of the present disclosure over prior art is the decoupling of the detectors from the wavelength reference and the wavelength timing signal such that the detectors sample data asynchronously with respect to the timing signal and the wavelength reference of the SWS.

Embodiments of the present disclosure can be deployed with existing SWSs, allowing immediate resolution improvement without repurchase of expensive SWS transmitter infrastructure, or they may be applied to construct a new SWS.

The present disclosure improves on any swept wavelength system, including the aforementioned single or double etalon timing signal generating systems for desktop or distributed SWSs described in FIGS. 1-5. Improved sampling resolution without increasing noise or measurement time can be achieved by replacing the detectors 22, 24 in FIGS. 1 and 2 or 41 and 44 in FIG. 3 with high speed asynchronously sampling detectors and by replacing the correlator 20 in FIG. 2 or DSP 50 in FIG. 3 with a high wavelength resolution correlator.

These new components perform similar high-level functions as in their replaced counterparts, but work together to provide the improved performance as described below.

Figure 1:
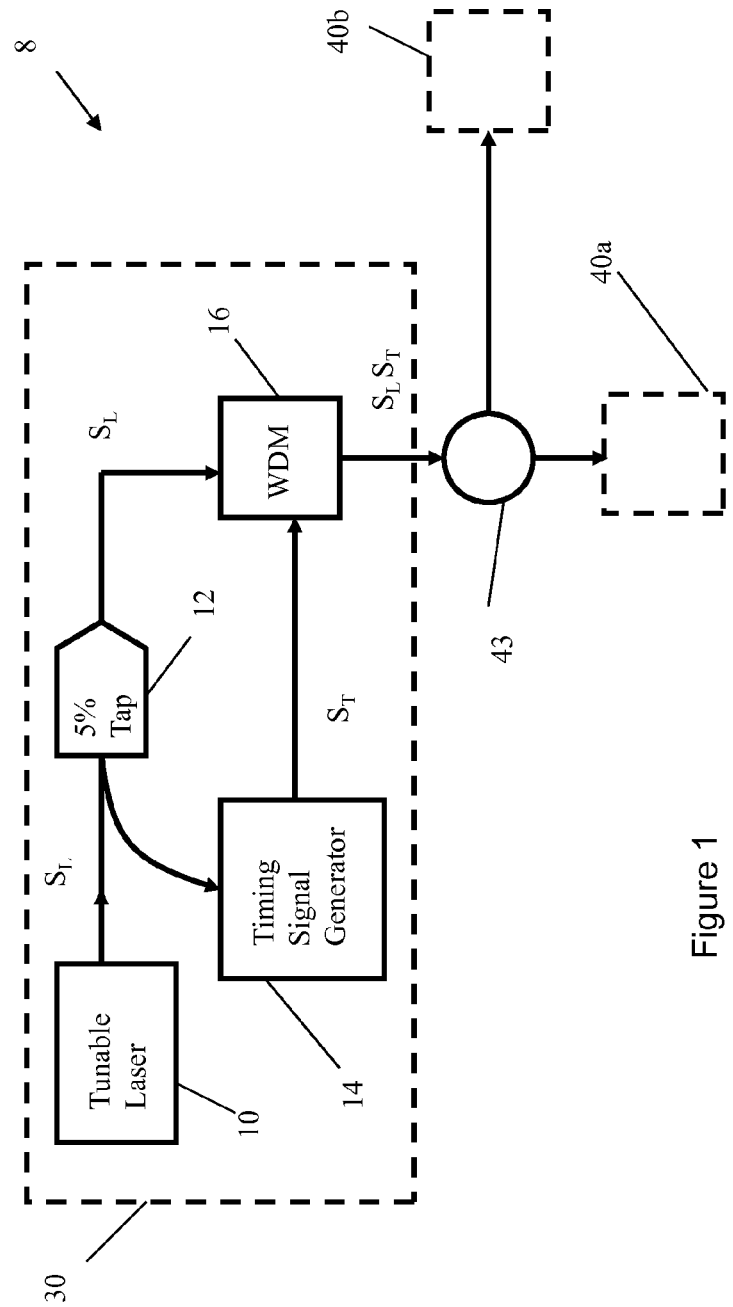
FIG. 1 is a block diagram illustrating an existing distributed swept wavelength system.
Figure 2:
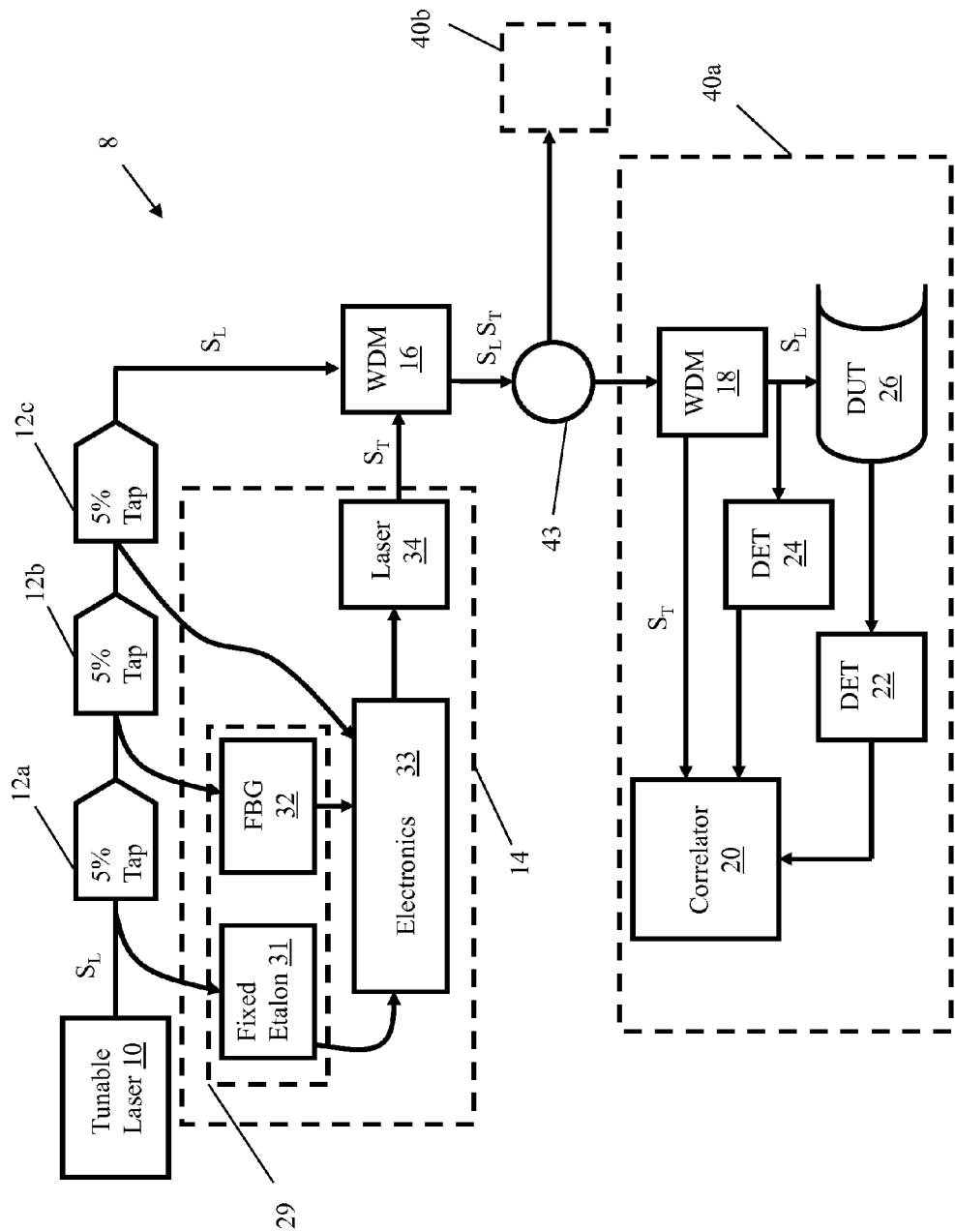
FIG. 2 is a block diagram illustrating another existing distributed swept wavelength system.
Figure 3:
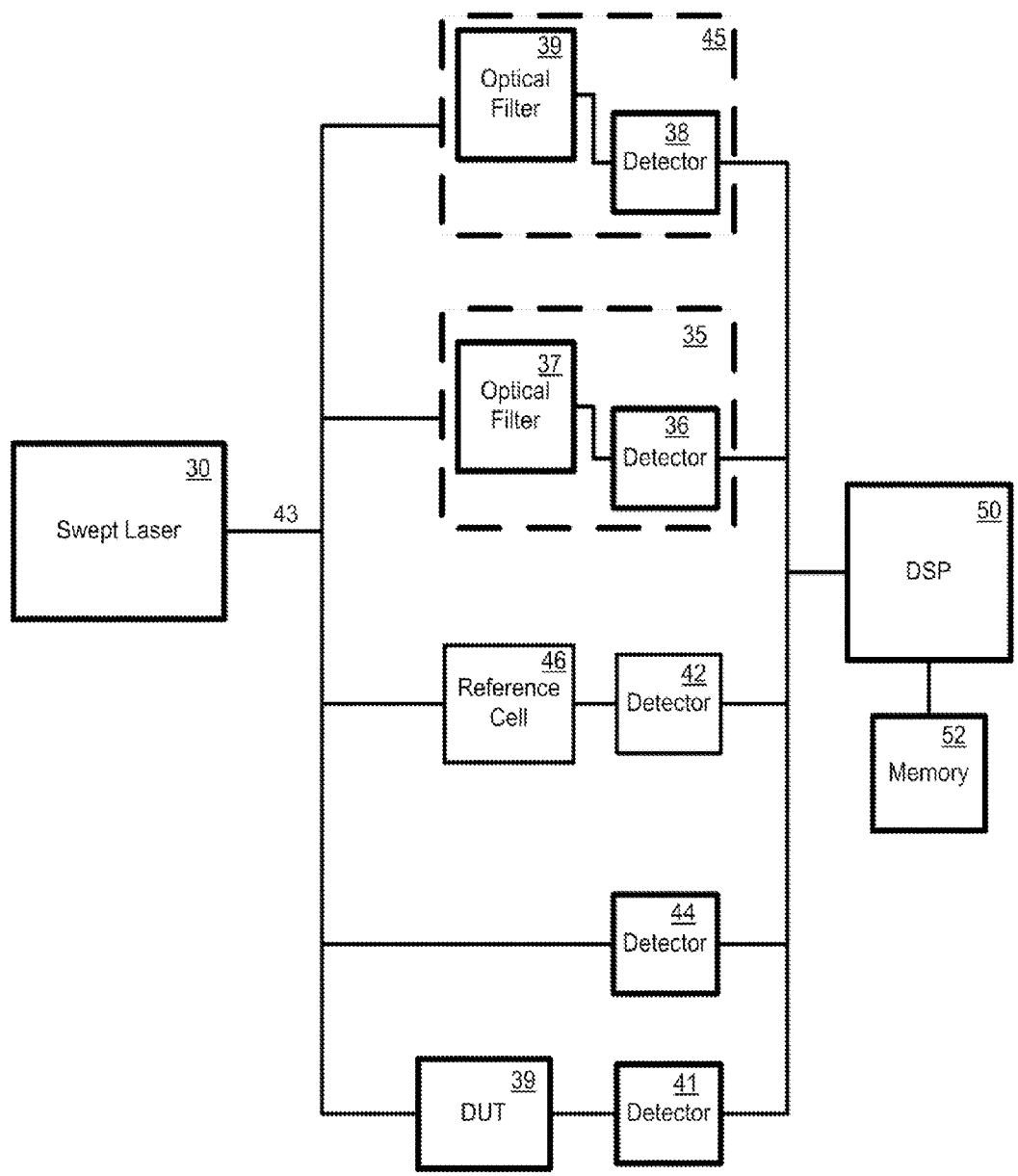
FIG. 3 is a block diagram illustrating a further existing swept wavelength system.
Figure 4:
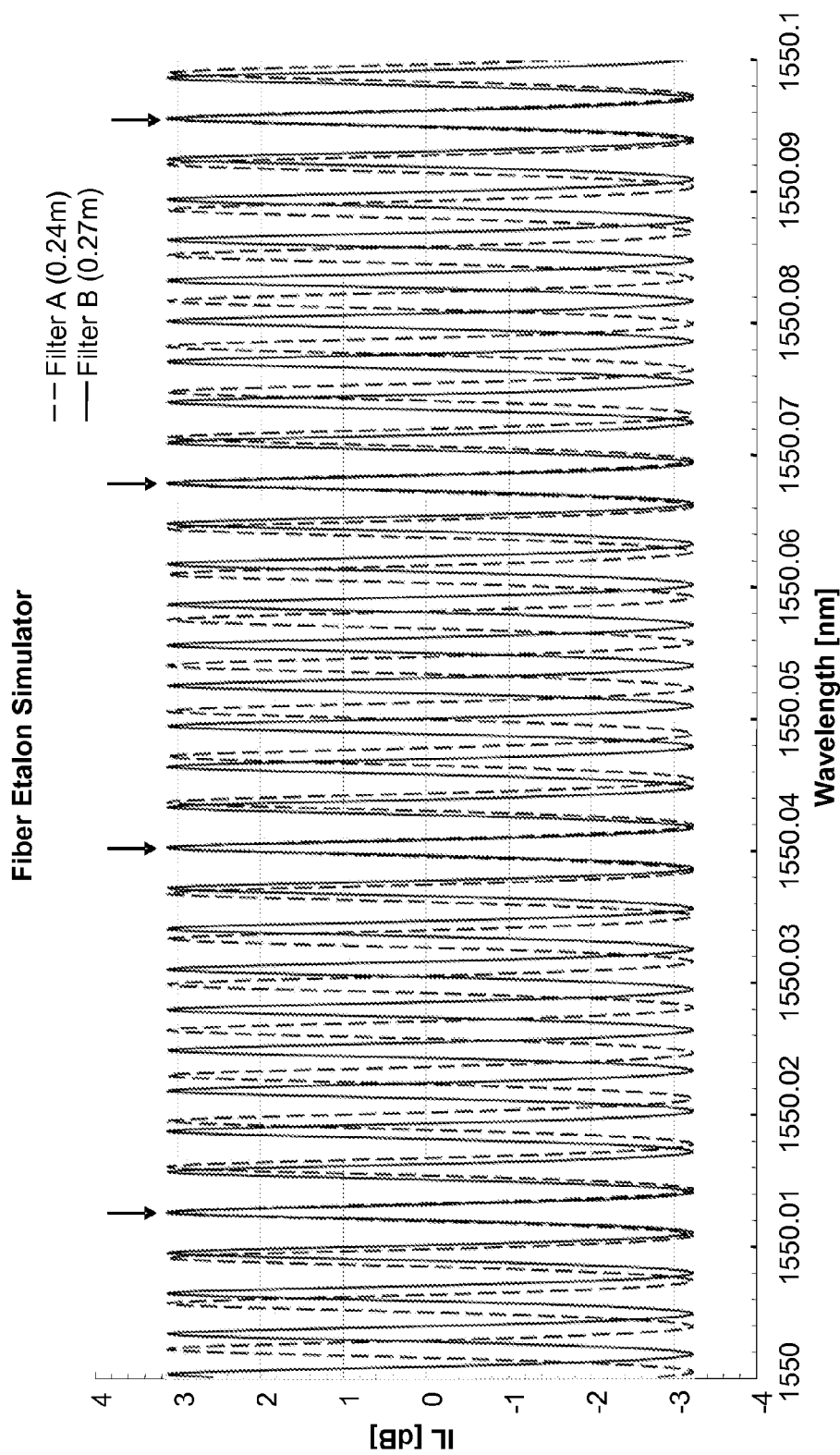
FIG. 4 is a graph illustrating synchronization points of two filters from FIG. 3.
Figure 5:
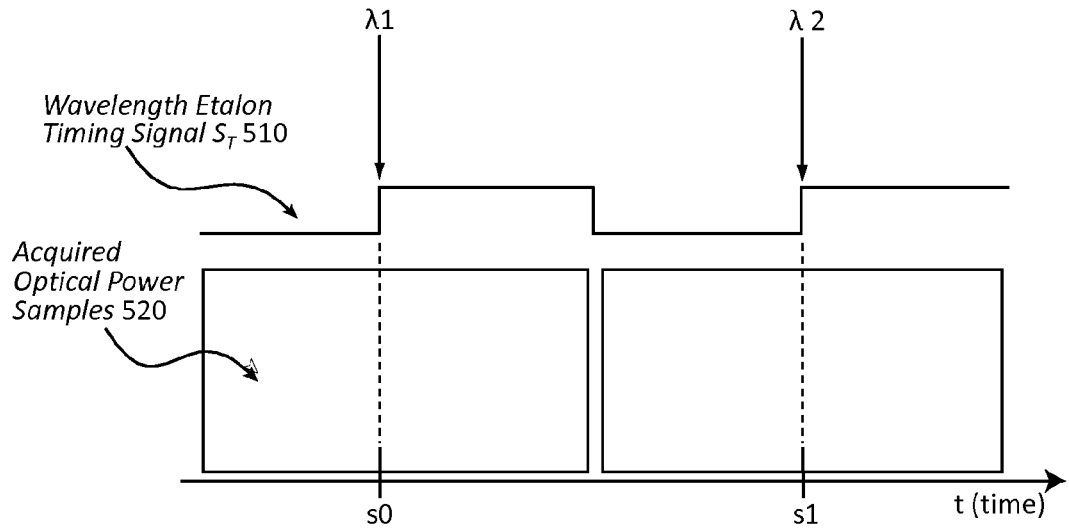
FIG. 5 is a time graph illustrating synchronous optical power data sampling and wavelength correlating in existing swept wavelength systems.
Figure 6A:
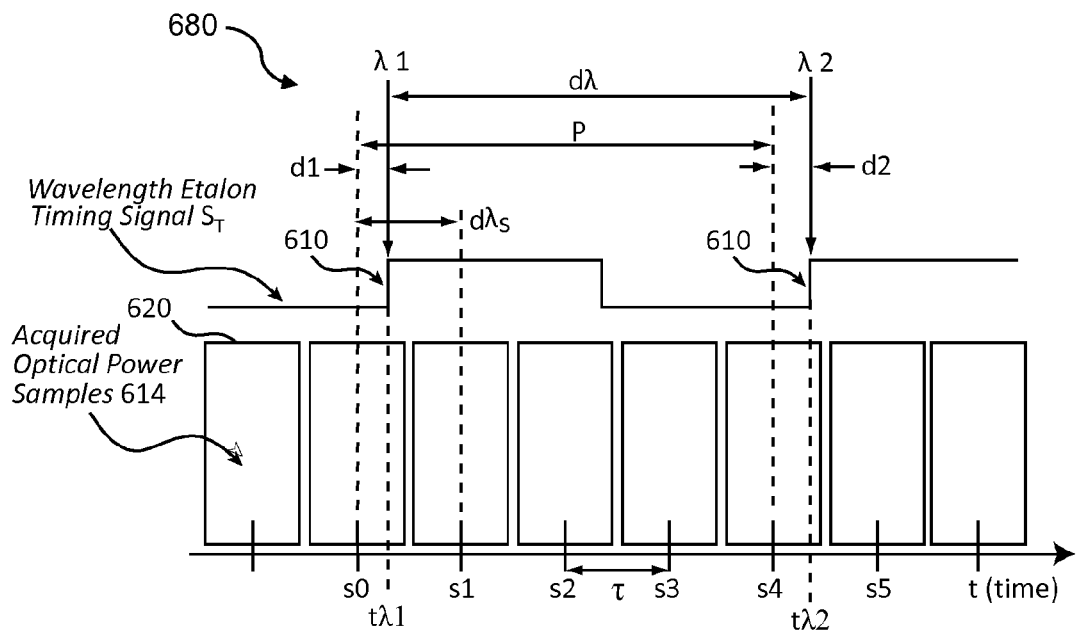
FIG. 6A is a time graph illustrating asynchronous oversampling relative to the wavelength timing signal according to the present disclosure.
Figure 6B:
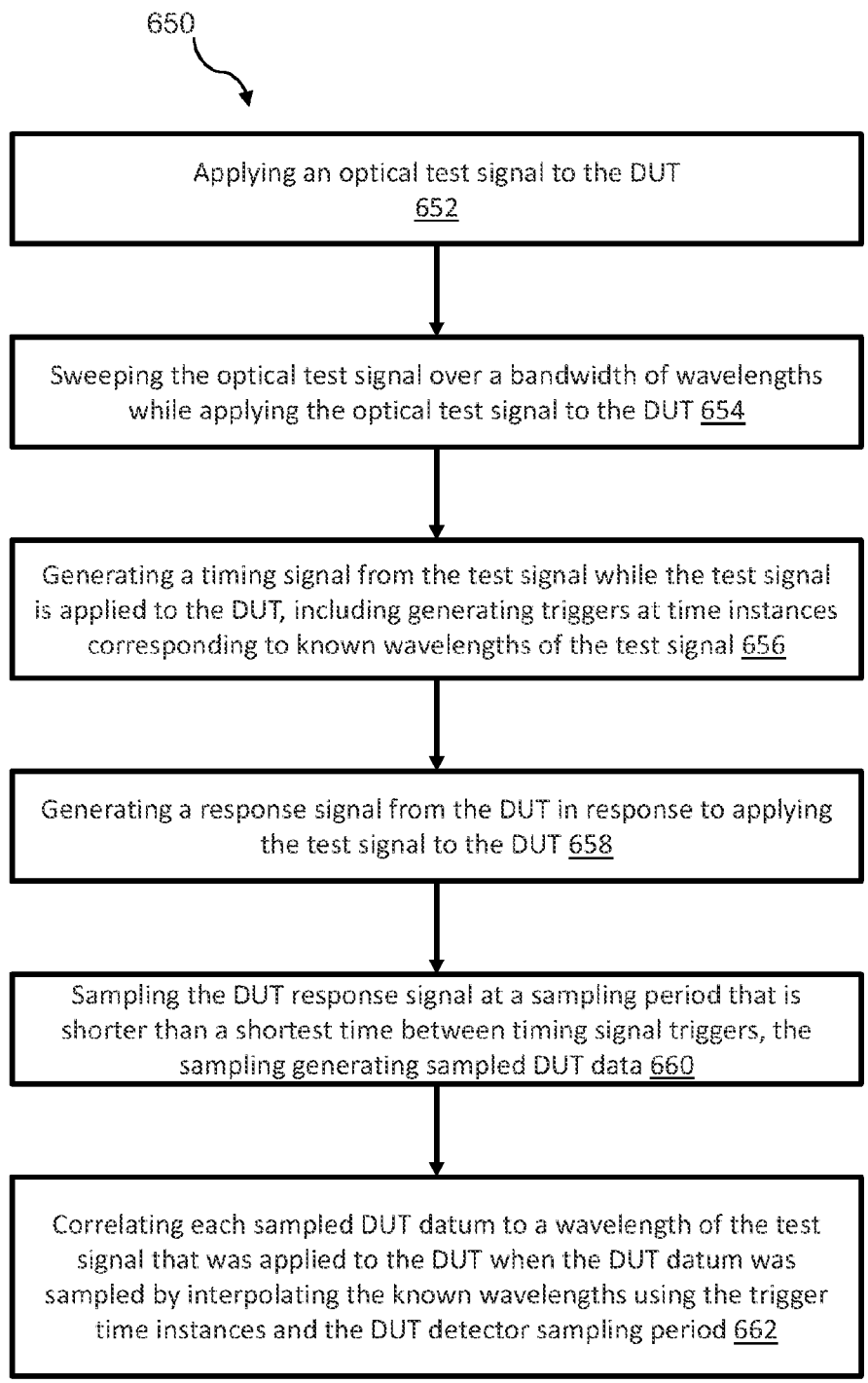
FIG. 6B is an example method according to the present disclosure.
Figure 6C:
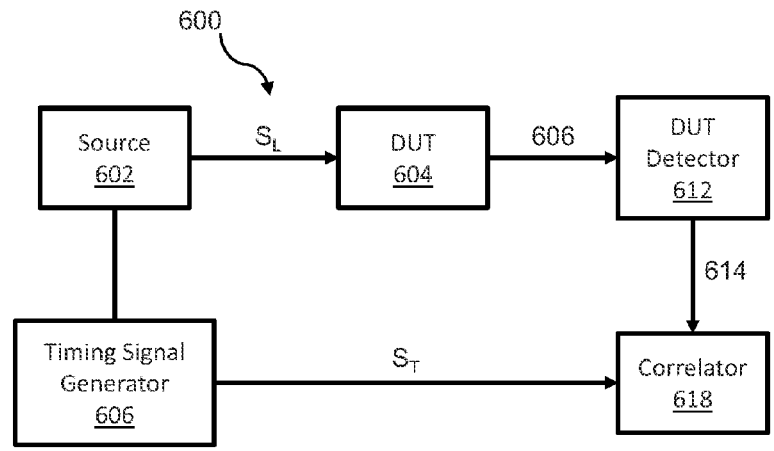
FIG. 6C is a block diagram illustrating an apparatus according to the present disclosure.

Referring now to FIGS. 6A-C, a time graph 680, a method 650 and an apparatus 600 according to the present disclosure is illustrated. Starting with the apparatus in FIG. 6C, a source 602 is provided for generating an optical test signal $S_L$ sweeping a bandwidth of wavelengths over time. The test signal $S_L$ is provided for application to a device under test (DUT) 604 to generate a response signal 606 from the DUT 604. A timing signal generator 608 is connected to the source 600 for generating a timing signal $S_T$. The timing signal $S_T$ has triggers 610 generated at time instances $t\lambda 1$, $t\lambda 2$ corresponding to known wavelengths $\lambda 1$, $\lambda 2$ of the test signal $S_L$. A DUT detector 612 is provided for sampling the DUT response signal 606 to generate sampled DUT data 614. The DUT detector 612 has a sampling period ($\tau$) that is shorter than a shortest time between timing signal triggers 610, which is to say, shorter than the shortest wavelength timing signal period ($d\lambda$). A correlator 618 is provided for receiving the timing signal $S_T$, the known wavelengths $\lambda 1$, $\lambda 2$ associated with the timing signal triggers 610, the sampled DUT data 614 and the DUT detector sampling period ($\tau$). The correlator 618 is provided for correlating each sampled DUT datum 614 to a wavelength of the test signal $S_L$ that was applied to the DUT 604 when the DUT datum was sampled. The correlator 618 correlates these values by interpolating the known wavelengths $\lambda 1$, $\lambda 2$ using the timing information $t\lambda 1$, $t\lambda 2$ from the timing signal triggers 610 and the DUT detector sampling period ($\tau$).

Referring back to FIG. 6B, an example method 650 for testing a device under test (DUT) is illustrated. At 652, the method applies an optical test signal to the DUT. At 654, the method sweeps the optical test signal over a bandwidth of wavelengths while applying the optical test signal to the DUT. At 656, the method generates a timing signal from the test signal while the test signal is applied to the DUT, including generating triggers at time instances corresponding to known wavelengths of the test signal. At 658, the method generates a response signal from the DUT in response to applying the test signal to the DUT. At 660, the method samples the DUT response signal at a sampling period that is shorter than a shortest time between timing signal triggers, the sampling generating sampled DUT data. And at 662, the method correlates each sampled DUT datum to a wavelength of the test signal that was applied to the DUT when the DUT datum was sampled by interpolating the known wavelengths using the trigger time instances and the DUT detector sampling period.

The DUT detector sampling period $\tau$ may be asynchronous to the timing signal triggers 610. A second detector may be included for sampling the test signal $S_L$ to generate sampled test signal data. The second detector has a sampling period that is the same as the DUT detector sampling period $\tau$. The second detector is provided for sampling the test signal $S_L$ prior to the test signal $S_L$ being applied to the DUT 604. Where the second detector is provided, the correlator 618 receives the sampled test signal data and generates DUT response data by comparing time correlated sampled test signal data and sampled DUT data. The correlator may also average DUT data to reduce noise. Each averaged DUT datum can be generated by averaging S sampled DUT data surrounding the averaged DUT datum and interpolating a wavelength of the test signal that correlates to an averaged time instant of the S sampled DUT data 614. The correlator may also interpolate DUT data into N equally spaced time intervals in the trigger period $d\lambda$. Each interpolated DUT datum can be generated by interpolating the sampled DUT data 614 surrounding the corresponding interval and interpolating a wavelength of the test signal that correlates to the corresponding interval. The correlator may also interpolate fixed wavelength data corresponding to regularly spaced wavelengths in the test signal bandwidth. Each interpolated fixed wavelength datum can be generated by interpolating the sampled DUT data 614 and their corresponding wavelengths onto a regularly spaced wavelength grid. The source 602 may comprise multiple wavelength tunable optical sources. Each wavelength tunable optical source can span a different wavelength bandwidth such that the collective wavelength bandwidths of the multiple wavelength tunable optical sources define the bandwidth of the optical test signal.

Unlike existing SWSs, according to the present disclosure, the optical power data sampling 660 is decoupled from (and thus asynchronous to) the wavelength timing signal $S_T$, and the new correlator 618 is able to derive the precise wavelength associated with each data sample 614 after sampling by using the wavelength timing signal $S_T$ and the known wavelength references associated with it. This allows embodiments of the present disclosure to test DUTs 604 with high-speed sampling in time where each sample 614 is associated with the wavelength of the test signal $S_L$ applied to the DUT 604 by the correlator 618, thereby achieving higher resolution without changing the wavelength timing signal $S_T$ or the wavelength references used in the SWS.

Deriving the "precise" wavelength associated with each data sample is achieved by interpolation from the timing signal. This is contrasted with prior SWSs which determined an exact wavelength associated with each data sample through direct coupling of the timing signal, triggers and etalon peaks. According to the present disclosure, precise wavelength correlation is achieved by precise measurement of the timing offset between the timing signal and the sampling of the data to allow for accurate interpolation.

According to the present disclosure, increased sampling resolution can be achieved because the high resolution detectors 612 permit more than one optical power data sample 614 to be generated per etalon peak of the wavelength reference. The high resolution detectors 614 may also permit continuous sampling 660 of data 614 from the DUT 604. Because the high resolution detectors 612 are asynchronous to the wavelength reference, and because the correlator can determine the wavelength associated with each sample 614, high resolution is achieved because these detectors 612 can be set to any desired sampling period $\tau$ or time interval that is equal to or less than the shortest expected period $d\lambda$ or interval of the wavelength timing signal. Accordingly, many more than one sample of the DUT data can be recorded within one period of the wavelength timing signal $S_T$. In some embodiments, optical power data sampling can be interpolated to data points that are regularly spaced in wavelength or time, as will be described later in the present disclosure.

By sampling each DUT's optical power data at a higher rate, embodiments of the present disclosure provide the flexibility for the end user to trade off resolution, measurement time and noise level based on the types of measurements desired. Higher resolution increases noise and/or measurement time. Increased measurement time reduces noise and/or resolution.

Turning back to FIGS. 1-5, detectors 22, 24, 40, 44 in the existing SWSs obtain a single DUT data sample from each wavelength timing signal period. The new high speed detectors 613 can directly replace detectors (22,24 and 40,44) in FIGS. 1 and 2. Similarly, the new correlator 618 can directly replace correlator 20 or DSP 50 in FIGS. 1 and 2. In some embodiments of the present disclosure, an independent timer may also be added to the SWS; however, it is more common for the processor associated with the correlator 20, DSP 50 or other computing components in an existing SWS to be able to provide time measuring features.

The new high speed detectors 612 may monitor DUT data 606 continuously and sample at a user-configurable sampling rate τ that is higher than, and asynchronous to, the rate of etalon peaks from the SWS (which corresponds to the period dλ of the wavelength timing signal $S_T$). The new detectors 612 stream the optical power data samples 614 to the new correlator 618. In some embodiments, the new detectors 612 may comprise optical to electrical converters and analog to digital converters. In one embodiment, the detectors 612 consist of InGaAs photodetectors with a log amplifier that converts the photocurrent to a voltage that is proportional to the log of the photocurrent. This voltage is then converted to a digital measurement by an analog to digital converter.

In existing SWSs, the correlator 20 or DSP 50 correlates each DUT data sample to the known wavelength associated with each wavelength timing signal trigger. The new correlator 618 performs wavelength and power correlation as do existing SWSs, but the new correlator is able to do so for data samples 614 that are asynchronous to the wavelength reference (which provides correlation to known wavelengths of the test signal $S_L$). The new correlator 618 is also able to correlate wavelength and sampled data 614 at a higher resolution and performance with the super sampled data 614 from the new detectors 612. The new correlator 618 analyses optical power data samples 614 from the high resolution detectors 612, wavelength timing signal data $S_T$ and the known wavelengths λ1, λ2 associated with the wavelength timing signal data to determine a wavelength associated with each data sample 614. In some embodiments, the new correlator 618 may be a customized chip, DSP, FPGA or the like, or the new correlator 618 may comprise a computer processor, memory storing computer executable instructions implementing any of the methods described in the present disclosure, and any other computing components that are well known in the art.

Referring now to FIG. 6A, asynchronous optical power data sampling 660 and correlating 662 of these samples 614 to precise wavelengths based on the wavelength timing signal $S_T$ are illustrated in a time graph. The wavelength timing signal $S_T$ is illustrated above the optical power data signal. The rising edges of the wavelength timing signal will be referred to as triggers 610 and they correspond to the known, calibrated absolute wavelength references λ1, λ2. Either, or both rising and falling edges may be used as triggers 610, but for simplicity, these examples presume only the rising edges are triggers 610. The period of the wavelength timing signal (dλ) may be irregular depending on the characteristics of the sweeping wavelength test signal $S_L$.

The DUT data 606 being sample 660 by the new detectors 612 is represented by boxes 620 on the time scale. Detector sampling 660 may be periodic with sampling period τ, where τ is shorter than the shortest expected period of the wavelength timing signal (dλ). Put in another way, Detector sampling 660 may be at any sampling frequency, that is faster than the fastest expected wavelength timing signal frequency. The optical power data samples s0, s1, s2, s3, s4, s5 are generated periodically in time, but are asynchronous to the wavelength timing signal $S_T$. Accordingly, the wavelength associated with each sample 614, s0, s1, s2, s3, s4, s5 must be determined by the new correlator 618 using timing data associated with the triggers 610 (which are at known wavelengths λ1, λ2) and the sampling time s0, s1, s2, s3, s4 of each optical power data sample 614.

Correlation 662 between the wavelength timing signal $S_T$ and the sampled optical power data 614 is accomplished by correlating the timing offsets d1, d2 between the triggers 610 and the sample times associated with samples s0, s1, s2, . . . , s5. This allows the new correlator 618 to calculate the exact time instant of the wavelength reference with respect to the sample time τ.

Sampling hardware, which may form part of the new correlator 618, calculates the timing of the offsets d1, d2 between the each trigger 610 and the most previous sampling time instance s0, s4. The sampling hardware includes a high frequency clock used to measure the time instance s0, . . . , s5 of each data sample 614 and the time instance tλ1, tλ2 of each trigger 610. The sampling hardware then calculates the time offset d1, d2 between each trigger 610 and the previous sample 0, s4. This is generally done for every trigger 610 associated with the swept wavelength test signal $S_L$. A preferred implementation uses a 8 MHz clock, although any sufficiently high frequency clock can be used. The 8 MHz clock is a convenience in that it was an easy to generate clock frequency inside the digital circuitry that makes up the correlator 618. The clock frequency is fairly arbitrary, but it needs to be a high enough frequency to measure the timing offsets d1 and d2, with sufficient resolution, but not too high a frequency as to make the offset counts too large to handle conveniently in software and/or hardware. 8 MHz was found to be ideal in this particular embodiment.

The period of the wavelength timing signal is referred to as dλ. The period of the wavelength timing signal dλ can also be described as the time between the first and second triggers 610. The wavelength timing period dλ may be irregular because the sweeping of wavelengths in the test signal $S_L$ may be irregular. The wavelength timing period (dλ) in terms of the sampling period (τ) is calculated using the formula dλ=P−d1+d2, where:

P=number of samples 614 recorded between a first and a second triggers 610 d1=fraction of the sample period τ between the sample time immediately prior to the first trigger s0 and the first trigger 610 d2=fraction of the sampling period τ between the sample time immediately prior to the second trigger s4 and the second trigger 610

It is then possible to calculate the change (or delta) in time of the wavelength timing period per detector sample period ($dλ_s$) using the formula $dλ_s=(λ2−λ1)/dλ$, where:

λ1=the time instant of the first trigger tλ1 (associated with the known wavelength λ1)

λ2=the time instant of the second trigger tλ2 (associated with the known wavelength λ2)

dλ=the period of the wavelength timing signal in terms of the sampling period (τ), The delta per sample period ($dλ_s$) correlates to the difference in wavelength between two sequential samples 614 within the same wavelength period dλ. Because the wavelength period dλ is irregular, $dλ_s$ may vary for different wavelength periods, thus $dλ_s$ could be less accurate if used to determine the wavelength of samples in a different wavelength period. Within the same wavelength period, the wavelength associated with each sample can be calculated using the formula $λ_s(n)=(n−d1)dλ_s+λ1$, where:

n=relative sample number in this wavelength period (i.e. n=2 for s2 in FIG. 6)

$λ_s(n)$ is the wavelength of sample n in this wavelength period

The increased number of DUT data samples 614 between triggers 610 (4 samples per trigger in FIG. 6A) provides improved wavelength resolution over existing SWSs. In a preferred embodiment of the present disclosure, a detector 612 sampling frequency of about 250 kHz is used to provide roughly 8 samples in each wavelength timing signal period dλ in a SWS with a 3 pm etalon wavelength reference sweeping at 100 nm/s. In other embodiments, a sampling frequency of between about 10 kHz to about 100 MHz can be used to provide roughly 1 to 10000 samples in each wavelength timing signal period with a 0.1 pm to 50 pm wavelength reference and sweeping at 1 nm/s to 200 nm/s. The wavelength spanned by the SWS does not impact the correlation; however, much more data is produced and must be correlated when the SWS spans all of the C band or all of the CL band. Other configurations are eminently possible and well within the scope of this disclosure.

In embodiments of the present disclosure, it is possible to interpolate the sampled data 614 to increase its utility and legibility for the end-user. This is possible because there are multiple data samples 614 within each wavelength period dλ (or between adjacent triggers 610). In contrast, existing SWSs would not have any data samples 520 between triggers (only data samples synchronous with each trigger), and thus such interpolations would not provide any improvement in their DUT data.

Figure 7:
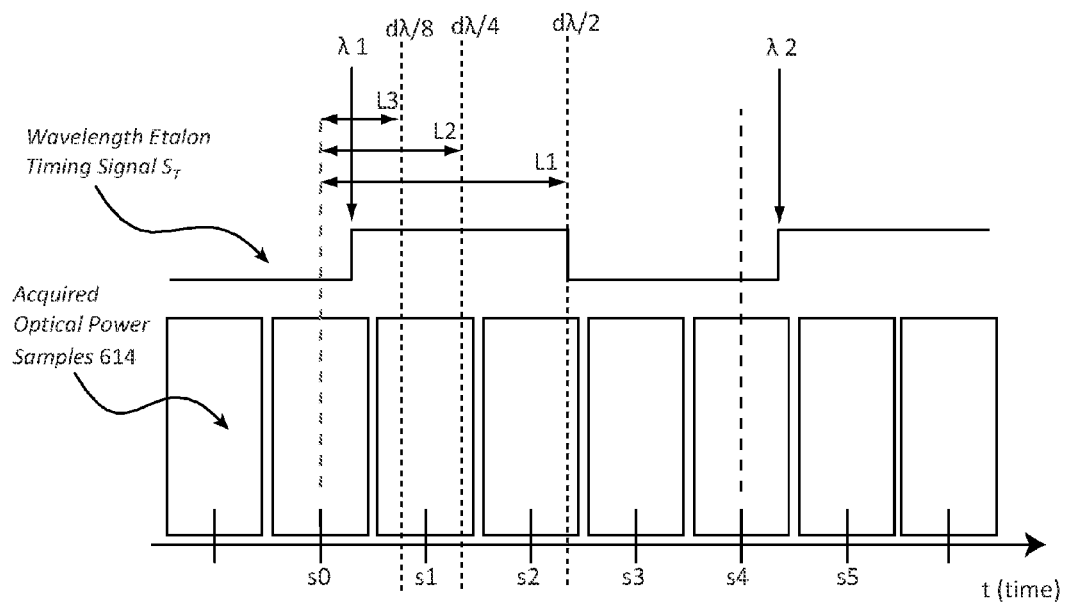
FIG. 7 is a time graph illustrating interpolating regularly spaced time intervals in a wavelength timing signal according to the present disclosure.

One useful interpolation that may be applied by embodiments of the present disclosure is determining the optical power at evenly divided time intervals relative to the known wavelengths (λ1, λ2, etc.) rather than at the irregularly timed etalon peaks. This is achieved by dividing each wavelength timing period dλ into equal time intervals (dλ/2, dλ/4, dλ/8, etc.), determining the time offset (L1, L2, L3, etc.) associated with each interval then interpolating the optical power data and wavelength at those time offsets from the data samples 614 and the wavelength references λ1, λ2, respectively. According to one embodiment demonstrated in FIG. 7, the wavelength timing period dλ is divided by multiples of powers of 2 (i.e. 2, 4, 8, 16, etc.), but any number of arbitrary, equally spaced intervals will work.

Since dλ is irregular from period to period of the timing signal, it is useful to simply talk about "evenly divided wavelength timing periods" (dλ/2, dλ/4, dλ/8, etc.) when increasing the resolution of the spectral data. The reason this is useful is because the timing wavelengths are known so (dλ/2, dλ/4, dλ/8, etc.) is easily determined. Otherwise, it would be necessary to keep track of the wavelength track for every interpolated sample. Since wavelength increases roughly linearly with time over each timing period, the names for wavelength intervals (d/2, dλ/4, dλ/8, etc.) are sometimes used interchangeably for the names of the timing intervals they are associated with. Accordingly, the present disclosure references time intervals (dλ/2, dλ/4, dλ/8, etc.) which also represent wavelength intervals (dλ/2, dλ/4, dλ/8, etc.).

The time instant L1 corresponds to the middle of the wavelength timing period (dλ/2) and can be calculated as L1=dλ/2+d1. Similarly, L2=dλ/4+d1, where L2 is the sample time corresponding to the time instant ¼ into the wavelength sampling period. This can be easily extended to determine the other instances (e.g. L3 at dλ/8 or ⅛$^{th}$ into the period) or for higher subdivisions such as ¾ into the period (not illustrated). The general formula for the time offset of the n$^{th}$ interval where dλ is divided into N equal intervals is Ln=n(dλ/N)+d1.

Figure 8:
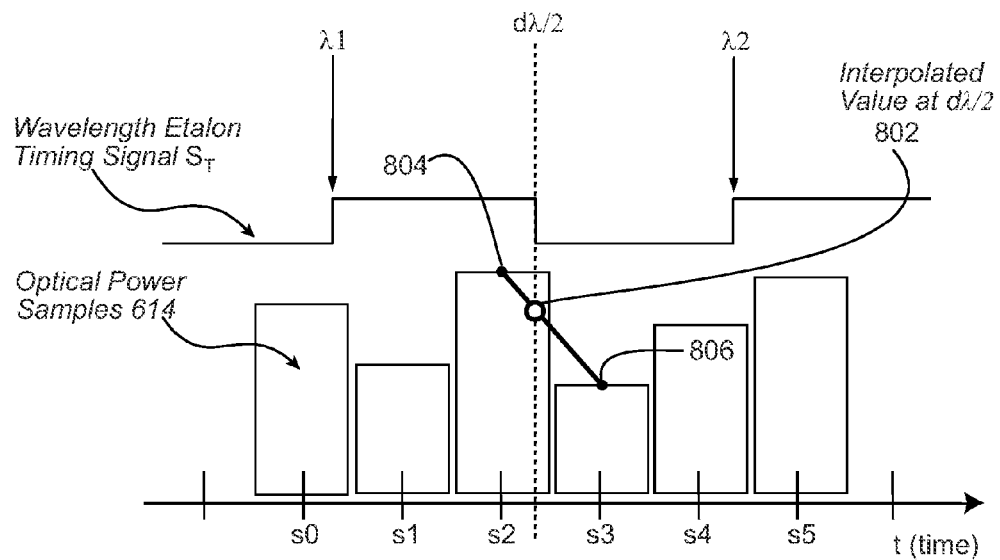
FIG. 8 is a time graph illustrating interpolation optical power data according to the regularly spaced time intervals according to the present disclosure.

Turning now to FIG. 8, the interpolated DUT data value 802 associated with each equally spaced time interval can be determined by common interpolation techniques applied to the adjacent sampled data 804, 806. In the embodiment demonstrated in FIG. 8, linear interpolation is used for simplicity and efficiency, but other interpolation techniques, such as polynomial, spline or yet other techniques are well within the scope of the present disclosure for achieving more accurate interpolation at the expense of increasing processing requirements.

The wavelength associated with the interpolated optical power data 802 and each equally spaced time interval can be calculated by interpolation of the known wavelengths, λ1, λ2 or wavelength references associated with each etalon peak using the timing information associated with the interpolated value 802. In FIG. 8, the wavelength $\lambda_{d\lambda/2}$ associated with an interpolated data point at time dλ/2 would be $\lambda_{d\lambda/2}$=λ1+dλ/2. Alternatively, $\lambda_{d\lambda/2}$ could be calculated back from the next trigger as $\lambda_{d\lambda/2}$=λ2−dλ/2. As above, any desired interpolation technique can be used to interpolate the wavelength associated with any data sample or interpolated data value within the wavelength timing period. Generally, the wavelengths spanning the wavelength timing period are evenly distributed over time.

Another interpolation that is possible from embodiments of the present disclosure which is not possible in prior SWSs is the ability to average multiple data samples 614 in order to improve noise performance or noise tolerance of the SWS. Since embodiments of the present disclosure can sample the DUT's optical power at a much higher rate than the wavelength timing signal, the additional samples can be averaged to reduce noise instead of, or in addition to, increasing sampling resolution. In some example embodiments, several samples 614 equally surrounding a trigger 610 can be averaged to reduce the effects of noise and the averaged data value can be associated with the wavelength reference associated with that trigger 610. In such embodiments the total DUT testing time would not necessarily increase because of the higher resolution sampling.

Figure 9:
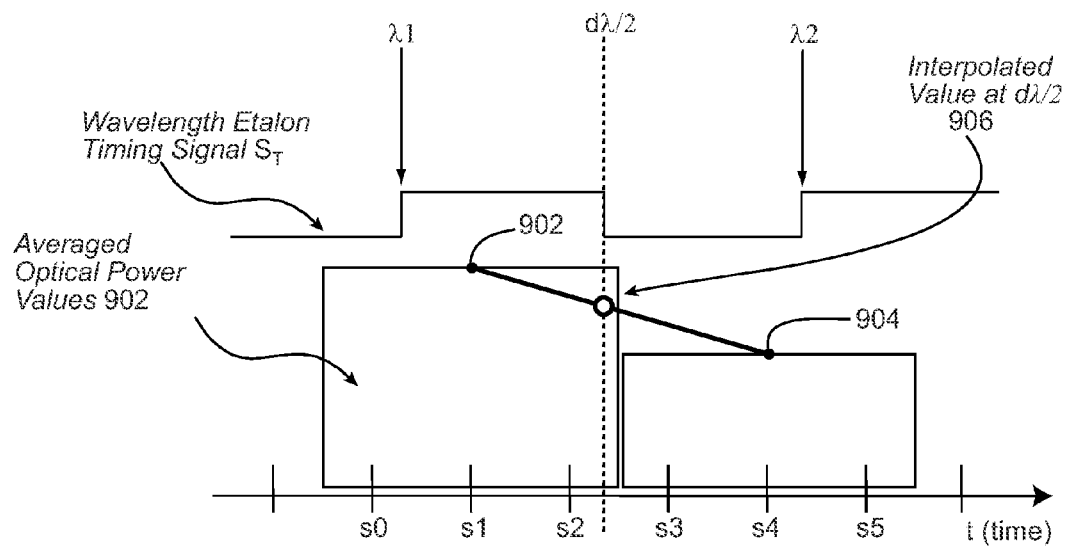
FIG. 9 is a time graph illustrating noise reduction by averaging and interpolation to regularly spaced time intervals according to the present disclosure.

A embodiment of the present disclosure achieving noise reduction and increased sampling resolution is demonstrated in FIG. 9. Groups of 3 data samples (as illustrated, a first group comprising s0, s1 and s2, and a second group comprising s3, s4 and s5) are averaged then the two averaged optical power 902, 904 values are interpolated to provide an interpolated value at dλ/2 906. This provides an interpolated value at twice the resolution of the wavelength timing signal. Similar to the un-averaged interpolation demonstrated in FIG. 8, the interpolated value at dλ/2 906 is interpolated from adjacent values 902, 904 using any desired interpolation techniques; however, in embodiments associated with FIG. 9, the adjacent averaged values 902, 904 are a combined and averaged accumulation of several samples. The averaging of the sampled values was obtained by simple numerical averaging, however any form of averaging or filtering can be used for performance reasons. FIG. 9 illustrates an example of the averaging of 3 samples; however, any number of samples can be averaged and any number of averages can be applied to further reduce the system noise. The resulting data values may become degraded if the number of averaged samples approaches the number of samples between intervals.

Another data interpolation possible through the higher resolution sampling of the present disclosure allows the optical power data 614 (or interpolated or averaged values) to be mapped to a regular, fixed wavelength grid. This has the benefits of controlling the number of points of acquired data, as well as allowing direct point-for-point comparisons of data from different SWSs and even data from the same SWS which may have changed calibration (for example if there was a long period of time between tests or where the calibration or components of the SWS may have been changed). This improvement is desirable since the wavelength reference used to generate the wavelength timing signal (and used for wavelength correlation as described above), is based on an optical etalon device which provides an irregularly periodic wavelength reference which is not aligned to any standard wavelength grid spacing and varies from SWS to SWS.

Figure 10:
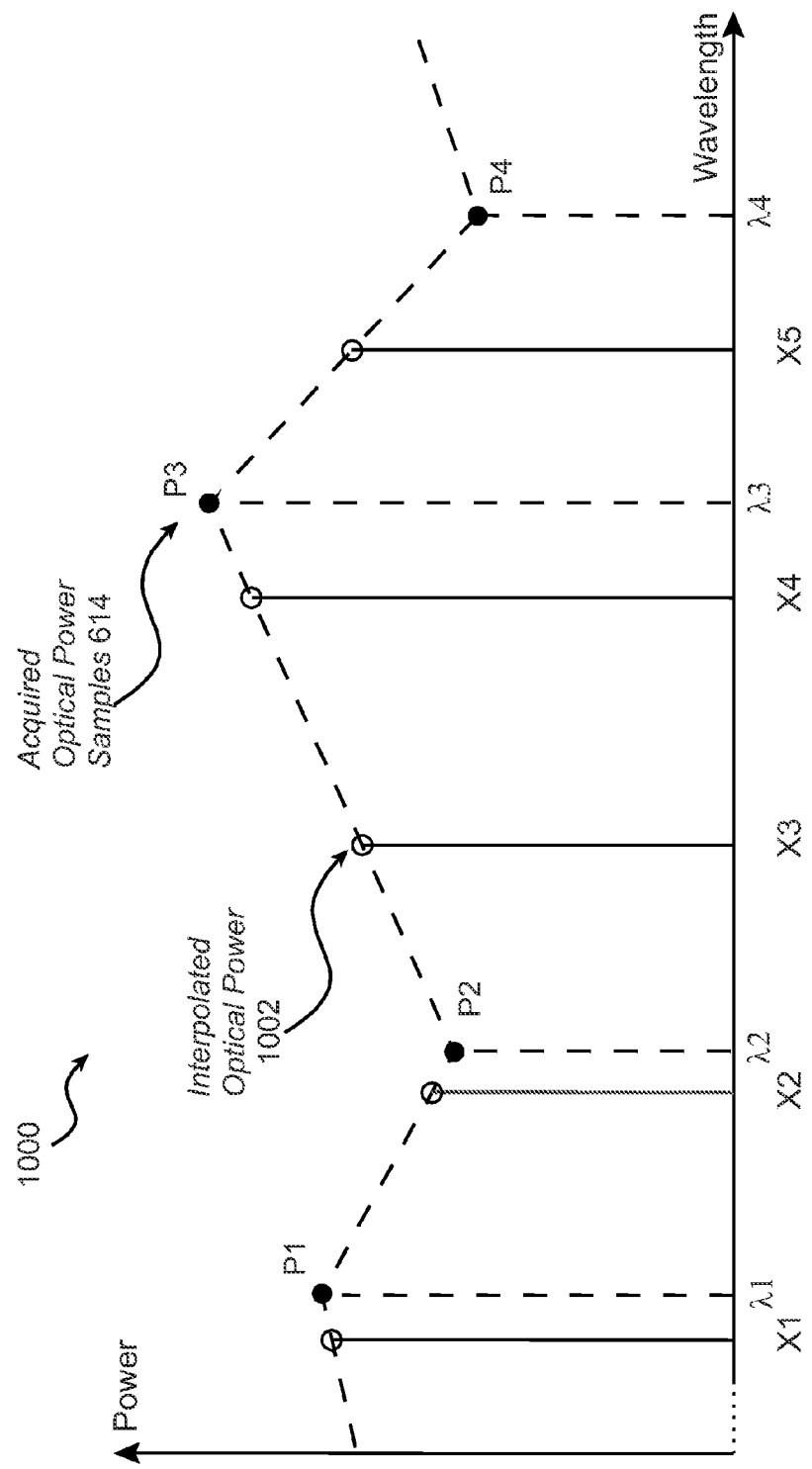
FIG. 10 is a wavelength graph illustrating interpolation to regularly spaced wavelength data according to the present disclosure.

Turning now to FIG. 10, mapping sample data to a regular, fixed wavelength grid 1000 using common linear interpolation is demonstrated. As before, any desired interpolation technique may be applied. In FIG. 10, the optical power data samples 614 at P1, P2, P3, P4 occur at irregularly spaced wavelength intervals $\lambda 1, \lambda 2, \lambda 3, \lambda 4$, etc. These data samples 614 are remapped to regularly spaced wavelengths X1, X2, X3, X4, X5, etc. by interpolating optical power values 1002 from the sampled data 614. In some embodiments, the regularly spaced wavelength grid may be at a 1 picometer or even 0.5 sub-picometer grid; however, any arbitrary, regular grid spacing can be used. For better results, the selected regular wavelength spacing should be greater than (or more coarse than) the data sampling resolution. This regular, fixed wavelength grid and its associated interpolation may be applied across the entire swept wavelength tested by the SWS.

In some embodiments, the present disclosure is implemented in software, typically stored on non-transitory computer readable media, for execution by a suitable computer processor to process the hardware supplied power acquisition and wavelength timing data. The hardware continuously acquires the optical power data through an Analog to Digital Converter (ADC) at a constant, user selectable sampling rate. Additionally with each ADC sample, the wavelength timing signal state and the time offset between the wavelength timing signal and first ADC sample of the current wavelength timing period, are provided to the correlator of the SWS. Using this data, a software or hardware implemented correlator can produce a high resolution optical spectrum applying the methods described in the present disclosure.

Figure 11:
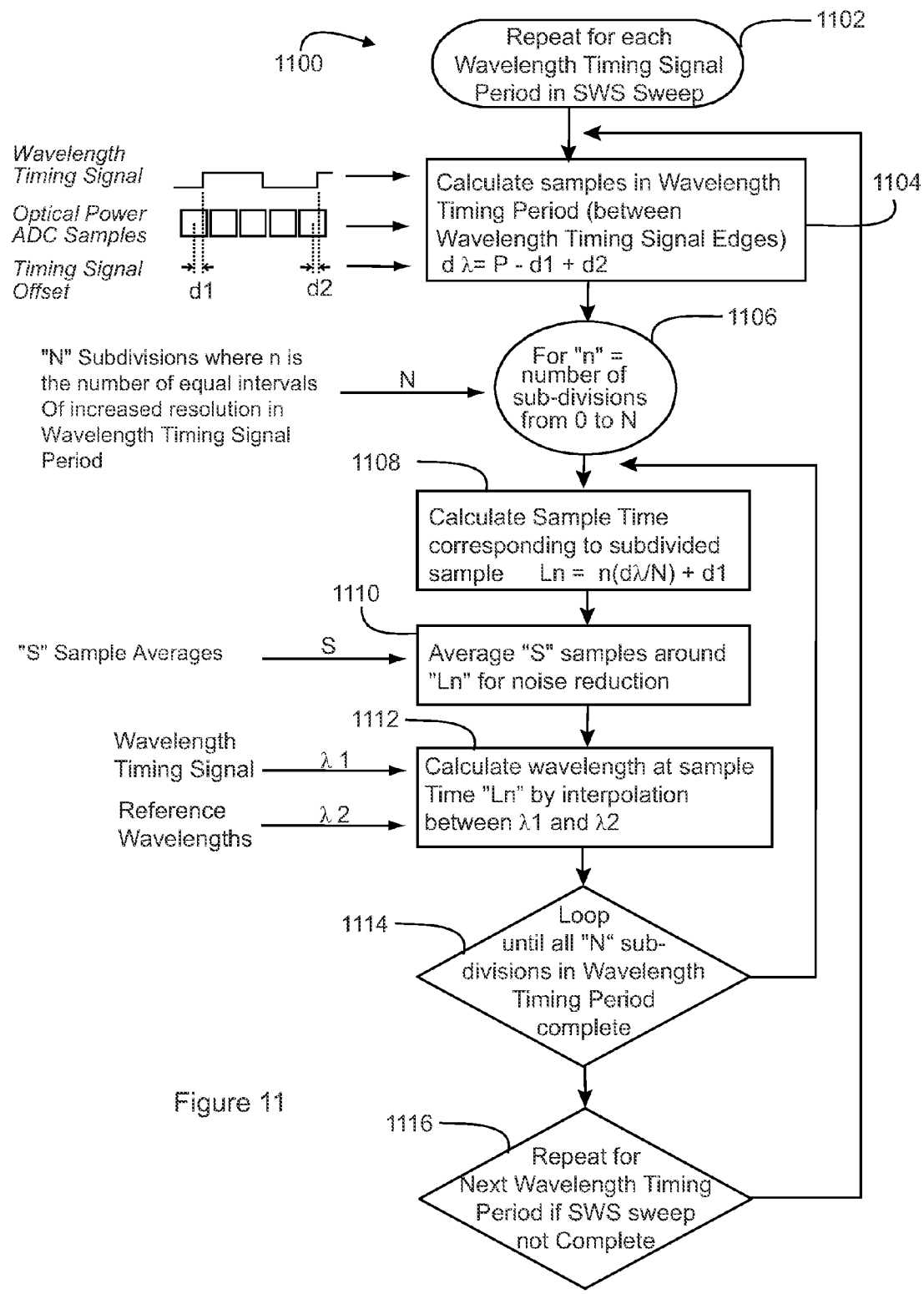
FIG. 11 is a flow chart illustrating a method for correlating wavelength data and optical power data according to the present disclosure.

Turning now to FIG. 11, a method of operation 1100 for a correlator of an SWS according to the present disclosure is illustrated. At 1102, the correlator 618 begins an analysis that is repeated for each wavelength timing signal period $d\lambda$ in the test signal's wavelength sweep. At 1104, the correlator 618 calculates the time duration of this wavelength timing signal period using the formula $d\lambda=P-d1+d2$ where the d1, d2 and P values are calculated from the timing information $t\lambda 1, t\lambda 2$ about the triggers 610 of the wavelength timing signal $S_T$ and the time instances s0, s1, s2, s3, etc of detector samples 614 provided to the correlator 618 or calculated elsewhere in the SWS.

At 1106, if each wavelength timing period $d\lambda$ is being interpolated into equally spaced time intervals, the correlator 618 enters a loop that repeats for each of the "N" intervals that the wavelength timing period $d\lambda$ has been divided into. This loop is optional because interpolation into equally spaced time intervals is optional.

At 1108, the correlator 618 calculates time instants corresponding to each of the equally spaced time intervals using the formula $Ln=n(d\lambda/N)+d1$. This is a generalized formula for N equally spaced time intervals from the formulas describe in respect of FIG. 7. For example, FIG. 7 corresponds to N=4, thus $L1=d\lambda/2+d1$ is the same as $2(d\lambda/4)+d1$. Alternatively, if the wavelength timing period $d\lambda$ is not subdivided into intervals, N=1 and the general formula $Ln=n(d\lambda/N)+d1$ becomes $Ln=nd\lambda+d1$ which yields the time offset to either the first trigger (n=0) associated with wavelength $\lambda 1$ or the second trigger (n=1) associated with wavelength $\lambda 2$.

At 1110, the correlator 618 optionally averages S samples 614 using any desired averaging algorithm or algorithms to reduce noise in the optical power data.

At 1112, the correlator 618 calculates the wavelength associated with the resultant optical data value using any desired interpolation technique based on the wavelengths $\lambda 1$ and $\lambda 2$ associated with the two triggers 610 defining the wavelength timing period $d\lambda$. In this manner, an optical power data value from the DUT response 606 is associated with a wavelength from the test signal $S_L$ because they share the same timing information as determined by the correlator 618. The optical power data values may be sampled data 614, interpolated values 802, averaged values 902, 904, interpolated averaged values 906, uniform time intervals values within the wavelength timing period, fixed wavelength interpolated values 1002 or any combinations thereof.

At 1114, the correlator 618 determines whether to loop back to 1108 if further subdivisions of the wavelength timing period $d\lambda$ remain to be calculated. If not, the correlator 618 proceeds to 1116 where it determines whether to loop back to 1104 if further wavelength timing periods $d\lambda$ remain to be calculated in the swept wavelength test signal $S_L$. If not, the correlating process 1100 concludes.

Where any components, elements and features described in the present disclosure have been described in some way as connected to other components, elements and features, it is to be understood that such connection includes direct connections, connections through transmission media (wired and wireless) and indirect connections through any other components unless the present disclosure specifically indicates otherwise. For non-limiting example, the components, elements and features described and illustrated as connected in FIG. 6C may include other components elements and/or features intermediate between them.

Where examples, alternative embodiments and additional aspects of those embodiments have been described in the present disclosure, those examples, embodiments and aspects may be combined in any manner within a single embodiment unless the present disclosure suggests otherwise.

We claim:
1. An apparatus comprising:
   a source for generating an optical test signal sweeping a bandwidth of wavelengths over time, the test signal for application to a device under test (DUT) to generate a response signal from the DUT;
   a timing signal generator connected to the source for generating a timing signal, the timing signal having triggers generated at time instances corresponding to known wavelengths of the test signal;
   a DUT detector for sampling the DUT response signal to generate sampled DUT data, the DUT detector having a sampling period that is shorter than a shortest time between timing signal triggers;
   a correlator for receiving the timing signal, the known wavelengths associated with the timing signal triggers, the sampled DUT data and the DUT detector sampling period, the correlator for correlating each sampled DUT datum to a wavelength of the test signal that was applied to the DUT when the DUT datum was sampled by interpolating the known wavelengths using the trigger time instances and the DUT detector sampling period.

2. The apparatus of claim 1 wherein the DUT detector sampling period is asynchronous to the timing signal triggers.

3. The apparatus of claim 2 further comprising a second detector for sampling the test signal to generate sampled test signal data, the second detector having a sampling period that is the same as the DUT detector sampling period, the second detector sampling the test signal prior to the test signal being applied to the DUT;

wherein the correlator receives the sampled test signal data and further includes DUT response data generated by comparing time correlated sampled test signal data and sampled DUT data.

4. The apparatus of claim 2 wherein the correlator further includes averaged DUT data, each averaged DUT datum generated by averaging S sampled DUT data surrounding the averaged DUT datum and interpolating a wavelength of the test signal that correlates to an averaged time instant of the S sampled DUT data.

5. The apparatus of claim 2 wherein the time between two sequential triggers defines a trigger period and wherein the correlator further comprises interpolated DUT data corresponding to N equally spaced time intervals in the trigger period, each interpolated DUT datum generated by interpolating the sampled DUT data surrounding the corresponding interval and interpolating a wavelength of the test signal that correlates to the corresponding interval.

6. The apparatus of claim 2 wherein the correlator further includes interpolated fixed wavelength data corresponding to regularly spaced wavelengths in the test signal bandwidth, each interpolated fixed wavelength datum generated by interpolating the sampled DUT data and their corresponding wavelengths onto a regularly spaced wavelength grid.

7. A method for testing a device under test (DUT), the method comprising:
applying an optical test signal to the DUT;
sweeping the optical test signal over a bandwidth of wavelengths while applying the optical test signal to the DUT;
generating a timing signal from the test signal while the test signal is applied to the DUT, including generating triggers at time instances corresponding to known wavelengths of the test signal;
generating a response signal from the DUT in response to applying the test signal to the DUT;
sampling the DUT response signal at a sampling period that is shorter than a shortest time between timing signal triggers, the sampling generating sampled DUT data; and
correlating each sampled DUT datum to a wavelength of the test signal that was applied to the DUT when the DUT datum was sampled by interpolating the known wavelengths using the trigger time instances and the DUT detector sampling period.

8. The method of claim 7 wherein the DUT detector sampling period is asynchronous to the timing signal triggers.

9. The method of claim 8 further comprising:
sampling the test signal prior to the test signal being applied to the DUT, sampling the test signal at the same sampling period as sampling of the DUT response signal, thereby generating sampled test signal data; and
generating DUT response data by comparing time correlated sampled test signal data and sampled DUT data.

10. The method of claim 8 further comprising:
generating averaged DUT data having reduced noise, each averaged DUT datum generated by averaging S sampled DUT data surrounding the averaged DUT datum and interpolating a wavelength of the test signal that correlates to an averaged time instant of the S sampled DUT data.

11. The method of claim 8 further comprising:
defining the time between two sequential triggers as a trigger period;
dividing each trigger period into N equally spaced timer intervals; and
generating interpolated DUT data corresponding to the N intervals, each interpolated DUT datum generated by interpolating the sampled DUT data surrounding the corresponding interval and interpolating a wavelength of the test signal that correlates to the corresponding interval.

12. The method of claim 8 further comprising generating interpolated fixed wavelength data corresponding to regularly spaced wavelengths in the test signal bandwidth, each interpolated fixed wavelength datum generated by interpolating the sampled DUT data and their corresponding wavelengths onto a regularly spaced wavelength grid.

13. A non-transitory computer readable medium having computer executable instructions stored therein, the instructions comprising:
instructions for directing a source to generate an optical test signal sweeping a bandwidth of wavelengths over time;
instructions for applying the test signal to a device under test (DUT) to generate a response signal from the DUT;
instructions for directing a timing signal generator connected to the source to generate a timing signal, the timing signal having triggers generated at time instances corresponding to known wavelengths of the test signal;
instructions for directing a DUT detector to sample the DUT response signal and generate sampled DUT data;
instructions for setting a sampling period of the DUT detector that is shorter than a shortest time between timing signal triggers;
instructions for correlating each sampled DUT datum to a wavelength of the test signal that was applied to the DUT when the DUT datum was sampled by interpolating the known wavelengths using timing information from the timing signal triggers and the DUT detector sampling period.

14. The non-transitory computer readable medium of claim 13 further comprising:
instructions for sampling the test signal prior to the test signal being applied to the DUT, sampling the test signal at the same sampling period as sampling of the DUT response signal, thereby generating sampled test signal data; and
generating DUT response data by comparing time correlated sampled test signal data and sampled DUT data.

15. The non-transitory computer readable medium of claim 14 further comprising:
instructions for generating averaged DUT data having reduced noise, each averaged DUT datum generated by averaging S sampled DUT data surrounding the averaged DUT datum and interpolating a wavelength of the test signal that correlates to an averaged time instant of the S sampled DUT data.

16. The non-transitory computer readable medium of claim 14 further comprising:
instructions for defining the time between two sequential triggers as a trigger period;
instructions for dividing each trigger period into N equally spaced timer intervals; and
instructions for generating interpolated DUT data corresponding to the N intervals, each interpolated DUT datum generated by interpolating the sampled DUT data surrounding the corresponding interval and interpolating a wavelength of the test signal that correlates to the corresponding interval.

17. The non-transitory computer readable medium of claim 14 further comprising instructions for generating interpolated fixed wavelength data corresponding to regularly spaced wavelengths in the test signal bandwidth, each interpolated fixed wavelength datum generated by interpolating the sampled DUT data and their corresponding wavelengths onto a regularly spaced wavelength grid.

18. The non-transitory computer readable medium of claim 14 further comprising wherein the instructions for applying an optical test signal to the DUT further comprise instructions for transmitting the optical test signal using sequential wavelength tunable optical sources depending on the wavelength being swept and the bandwidth of the multiple tunable optical sources, such that the collective wavelength bandwidths of the multiple wavelength tunable optical sources define the bandwidth of the optical test signal.

* * * * *